United States Patent [19]

Graube

[11] 4,099,971
[45] Jul. 11, 1978

[54] METHOD FOR FABRICATING REFLECTION INFRARED HOLOGRAMS

[75] Inventor: Andrejs Graube, Venice, Calif.

[73] Assignee: Hughes Aircraft Company, Culver City, Calif.

[21] Appl. No.: 755,755

[22] Filed: Dec. 30, 1976

[51] Int. Cl.² .................. G03C 5/04; G03C 11/00; G03C 5/32; G02B 3/00
[52] U.S. Cl. .................. 96/27 H; 96/27 E; 96/45.2; 96/46; 96/60 R; 350/3.61
[58] Field of Search ............ 96/27 H, 27 E, 46, 60 R, 96/45.2; 350/3.5

[56] References Cited

U.S. PATENT DOCUMENTS

| | | | |
|---|---|---|---|
| 3,695,879 | 10/1972 | Laming et al. | 96/27 H X |
| 3,967,176 | 7/1976 | Graube | 96/27 H |
| 4,028,104 | 6/1977 | Graube | 96/27 H |

*Primary Examiner*—Edward C. Kimlin
*Assistant Examiner*—Alfonso T. Suro Picó
*Attorney, Agent, or Firm*—B. T. Hogan, Jr.; W. H. MacAllister

[57] ABSTRACT

Infrared (IR) holograms are fabricated from holograms recorded with visible light in photographic silver halide emulsions. The process facilitates image reconstruction at longer IR wavelength than presently considered possible with conventional IR holographic materials.

6 Claims, 3 Drawing Figures

METHOD FOR FABRICATING REFLECTION INFRARED HOLOGRAMS

RELATED APPLICATIONS

U.S. Pat. No. 4,028,104, dated June 7, 1977 entitled "Infrared Hologram Recording Method With Herschel Effect" issued to Applicant herein discloses a method for rendering silver halid emulsion films, normally insensitive to infrared (IR) wavelengths, sensitive to IR wavelengths and teaches how to fabricate IR holograms directly in silver halide emulsion films.

The present application discloses the results of continuous research efforts designed to yield methods of fabricating IR holograms at wavelengths longer than previously shown to be possible with the prior art teachings which utilize silver halide emulsion films.

BACKGROUND OF THE INVENTION

1. Field of the Invention

This invention is directed generally to methods of fabricating holograms and more particularly to a method of fabricating reflective holograms for reconstruction at infrared wavelengths in silver halide emulsion films.

2. Prior Art

Infrared optical systems are well known in the prior art. These systems are used in a multiplicity of military and domestic applications. A typical system is the layer designation utilized by the Air Force for target designation. One limitation of these prior art systems stems from the necessity of employing lenses fabricated from special glass or mirrors ground to close tolerances, both of which are unduly heavy, bulky, difficult to fabricate and expensive.

Holograms have been found to be an ideal substitute in certain optical systems requiring lenses and/or mirrors. These holograms are fabricated from direct light systems and recording media and subsequently reconstructed at the recording light wavelengths.

Transmission infrared holograms have been fabricated in photographic silver halide emulsions and dichromated gelatin films by first recording images in the recording medium with visible light at a transmission hologram exposure angle $\alpha$. These recordings are then used to reconstruct the image with IR light at a transmission hologram play-back angle $\beta$. Previously it has not been possible to make reflective holograms with visible light for subsequent playback or reconstruction at IR wavelengths.

Reflective IR holograms have not, to my knowledge, been successfully fabricated by direct recordings in a photographic emulsion or other photosensitive film other than as taught by Applicant in U.S. Pat. No. 4,028,104, dated June 7, 1977. The reflective holograms of Applicant's prior application are limited in their use to the near IR wavelengths. The instant invention constitutes an advancement over the teachings of Applicants prior filed application by extending the image in which silver halide emulsion films may be utilized in IR applications.

In general all reflective holograms are reconstructed at identical or shorter wavelengths than that utilized to record the image in the recording photographic emulsion or film. This result may be explained in part by the teachings of E. N. Leith et al in his article entitled "Holographic Data Storage in Three-Dimensional Media", published August 1966 in Applied Optics, Vol. 5, No. 8 where the effect of shrinkage on the reflective characteristics of emulsions is discussed. Therefore other than as taught in aforesaid U.S. Pat. No. 4,028,104, the absence of direct IR recording emulsions or films has resulted in an absence of IR reflective holograms.

Reflective IR holograms designed to reflect specific IR wavelength will be useful in holographic optical elements (HOE'S) in that these holograms will reflect only specific IR radiation wavelength and the HOE would be transparent or absorptive to all other IR and visible light wavelengths.

SUMMARY OF THE INVENTION

An object of this invention is to provide a method for fabricating a hologram suitable for reflective reconstruction at specific IR wavelengths ranging from the near IR ($< 0.7$ m) to as high as 5.0 $\mu$m.

Another object is to provide a method of fabricating reflective IR holograms in photographic silver halide emulsions.

A still further objective of this invention is to provide a method by which existing visible light sensitive films can be used to reconstruct IR reflective holograms.

Other objectives of this invention will become obvious to those skilled in the art upon reading the following disclosure.

In seeking to meet the above stated objectives, while avoiding the above-mentioned disadvantages and limitations of the prior art, a method for extending the reconstruction wavelength of holograms recorded in silver halide emulsions with visible light, to specific IR wavelengths, has been invented.

Holograms, interference patterns, or images emanating from visible light sources are recorded as fringe patterns in photographic silver halide emulsions and conventionally developed and fixed. If a high diffraction efficiency is desired, a subsequent bleaching step is employed. The developed, fixed and/or bleached holograms are then treated to cause an expansion of the recorded film to a preselected thickness. This expansion causes a change in the spacings between the recorded fringe patterns in the emulsion or film which results in the reflection of specific IR wavelength radiations. Prior to the expansion treatment, photographic silver halide emulsions are transparent or absorptive to IR wavelengths.

DETAIL DESCRIPTION OF THE INVENTION

Figure 1:
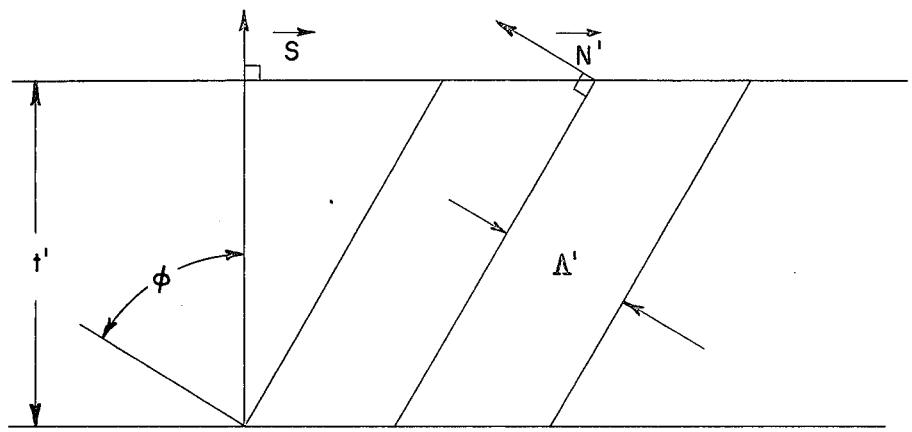
FIG. 1 is a section through a holographic film showing IRHOE fringe spacings.

In order to obtain a reflective hologram, the wavelength of the incident reconstruction light source must be matched to the fringe spacings recorded in the holographic medium. Whenever this occurs, the Bragg condition is said to be satisfied and the incident wavelength will be efficiently diffracted or reflected.

This constraint has heretofore precluded the fabrication of reflective IR holograms in photographic silver halide emulsions because fringe patterns were not recorded directly in such emulsions where the incident recording light wavelength extends into the infrared region.

Fringe patterns recorded in silver halide emulsions from incident beams emanating from a visible light source ($\lambda < 0.7\mu m$.) do not normally reflect light from an infrared source. Such materials are said to be transparent or absorptive with respect to IR light sources, and unable to record latent silver halide images.

However, it has been discovered that holograms fabricated from photographic silver halide emulsions utilizing visible light sources can be rendered suitable for reconstruction with IR light sources by increasing the spacings between the fringe lines, recorded within the emulsion, to a preselected distance.

This increase in spacing is achieved by causing the prerecorded visible light hologram to be expanded from its original thickness, after development, fixing and/or bleaching, in a controlled manner. Generally, prior art HOE researchers do not want their films or emulsion to change thickness after processing. See E. N. Leith et al supra.

This invention is practiced by selectively exposing a conventional photographic silver halide emulsion, coated onto a transparent substrate, to the interference patterns of visible light radiations. By conventional photographic silver halide emulsion is meant conventional photographic plates or films in which the emulsion contains a particulate granular silver halide in a gelatin or modified gelatin matrix. Silver halide emulsion includes silver chloride, silver bromide, or other halides used singly as well as in mixtures of these compounds such as silver chloride-bromide. The term transparent substrate is intended to cover both sheet film, photographic glass plates, or photographic emulsions formed on other substrates which are optically transparent to the visible light radiation that is used. Photographic plates such as Eastman Kodak Company's Type 649F or Agfa-Gevaert Company's Type 10E75 may be considered exemplary.

This exposure causes fringe patterns or lines to be formed or recorded within the silver halide emulsion which are subsequently altered in accordance with this invention to preselected spacings which cause the Bragg condition to be satisfied at IR wavelengths.

The exposed emulsion or film containing the latent hologram is then developed and fixed by anyone of a number of conventional processes for developing and fixing photographic silver halide emulsions and/or films to form a negative of the interference pattern.

The developers customarily used in processing the particular film employed may be used when processing plates of the present invention. For example, with Kodak Type 649F plates, Eastman Kodak Company's D-19 Developer may be used. The particular developers, stop baths, fixers, and other chemicals, such as surfactants, are all of conventional types as are employed in ordinary photographic processing.

In those instances where a high diffractive efficiency is desired, the visible light recorded and fixed hologram may be bleached. The bleaching step transforms silver grains in the emulsion to transparent silver salts by oxidation. The bleaching chemical employed may be any oxidizing agent which has the capacity to convert the metallic silver in the negative to a transparent silver salt, such as silver bromide or silver ferrocyanide. U.S. Pat. No. 3,967,963 issued to Applicant herein on July 6, 1976, contains teachings of a suitable bleaching method.

Having completed the fabrication of the visible light hologram, one then proceeds to alter the fringe line spacings therein by causing the emulsion or film to swell or expand to a preselected thickness.

This step is accomplished by subjecting the hologram to a high relative humidity environment or by applying a aqueous bath or aqueous-mixture bath to the developed and bleached hologram. Other processes for swelling holographic recording media are disclosed in "Volume Holograms In Photographic Emulsions of Extended Thickness" by Klaus Biedermann et al. (1972) Optics Communications, Volume 6, No. 2.

Water or water-glycerol solutions have been used with good success in causing silver halide emulsions coated onto transparent substrates to expand. It is obvious to to one skilled in the art that other lower polyalcohols such as ethylene glycol would function in a similar manner to cause film swelling. Also, polymers soluble in these solvents, such as polyvinylbutyral and the ester of polyvinylalcohol and proprionic acid, could be formed from the monomers to achieve simultaneous film expansion and geometrical stabilization of the film thickness.

Sequentially, one begins his fabrication process by calculating the fringe spacings and orientations required for the desired infrared holographic optical element IRHOE. This is accomplished in accordance with the teachings of Collier et al (R. J. Collier, C. B. Burckhardt, and L. H. Lin, *Optical Holography*, Academic Press, Inc., New York, N.Y., 1971), where thick diffraction grating theory is applied. The volume recording of interference patterns normally takes the form of a spatial modulation of the refractive index or absorption coefficient of the holographic material. The primary features of the thick volume holograms are dependent upon the angular orientation, fringe spacing, and wavelength restrictions imposed upon the wavefront reconstruction process by the Bragg condition.

Calculations are then made to ascertain what fringe spacings the IRHOE would have if the film were reduced to a selected volume or thickness. Except for plane wave holographic reconstruction, where the light point source locations are located at optical infinity, the interference fringes in the volume of the material will not have the same angular orientation or spacing at every point on the holographic surface. Rather, both the orientation and spacing will change with relative position on the plate or film, and these orientations and spacings must be calculated specified on the entire IRHOE surface.

With the above calculations in mind, one then calculates the necessary coherent wavefronts of the exposing beams or, in more simple geometries, the point source locations necessary to achieve the fringe spacings of the reduced film thickness with visible light.

A photographic plate having a silver halide emulsion of a thickness corresponding to that of the reduced film thickness above is then exposed to complex wavefronts or to visible light sources located at the calculated point source location. This step results in the formation of a visible light holographic optical element (VLHOE) having fringe lines recorded by visible light but transparent or absorptive with respect to IR light radiations.

The VLHOE latent image is subjected to conventional development and fixing steps to permanently record the fringe lines within the emulsion to form an amplitude hologram. Bleaching may be employed at this point, if desirable, for volume phase hologram formation.

The final steps of this invention entails the treatment of the VLHOE with a swelling agent such as $H_2O$, $H_2O$-glycerol solutions, or other aqueous mixtures until the emulsion or film thickness is increased to the point where the fringe line spacings are expected to be equal to that required to yield the desired IRHOE and fixing the film at the desired thickness. The swelling agents disclosed herein are meant to be only examples of swelling agents for gelatin and are not meant to limit the scope of this invention.

Films subjected to the swelling treatment where water and a water-glycerol solution were employed as swelling agents were fixed by placing a glass cover on the top of the swollen film and sealing the edges to preclude a loss of the moisture content. The swollen film thickness may also be fixed by quickly polymerizing a monomer utilized to cause the film expansion. The key is to ensure as little change of film thickness, after the intended film expansion is accomplished, as possible.

When prepared in the above manner, IRHOE will reflect IR light along very narrow bandwidths in accordance with the calculated fringe line spacings and orientations. A specific example of an IRHOE prepared in accordance with this invention is shown below.

EXAMPLE I

The calculation of the visible light ray directions necessary to expose a VLHOE to be expanded into an IRHOE involves the reverse procedure of the present invention. The desired IRHOE is first defined with respect to fringe angle and spacing, then the film is contracted to VLHOE size, and finally the exposing visible light wavefront directions are determined.

Figure 2:
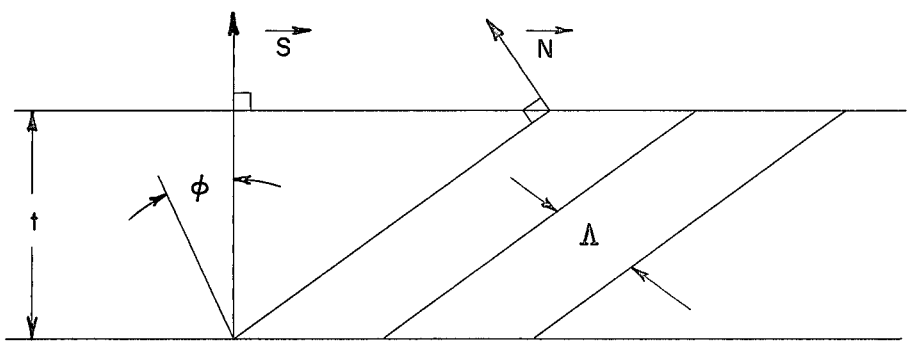
FIG. 2 is a section through a holographic film showing the VLHOE fringe spacings.

The desired IRHOE fringe can be visualized by taking a section of a IRHOE perpendicular to the film substrate, referring to FIG. 1. In a particular IRHOE area the desired interference fringe spacing is $\lambda'$, with unit vector $\vec{N}'$ being perpendicular to the fringes and also lying in the plane of the paper. Unit vector $\vec{N}'$ forms an angle $\phi'$ with the unit vector $\vec{S}$, which is perpendicular to the film surface. The symbol $t'$ denotes swollen or expanded film thickness. These desired IRHOE interference fringe lines will form the desired reconstructed wavefront derived by Bragg or Laue diffraction of an incident wavefront, as shown in the teachings of Collier et al. The collapsed film, shown in FIG. 2, presents the same fringes as in FIG. 1, except that the fringe spacing has changed to $\lambda$; unit vector normal to the fringes to $\vec{N}$; the angle between $\vec{N}$ and the surface normal unit vector $\vec{S}$ to $\phi$; and the thickness to $t$. The swelling factor by which the film has undergone dimensional change, $m$, relates the two thicknesses by:

$$t' = mt. \tag{1}$$

The swollen fringe spacings, $\lambda'$, are a function of the thickness change factor and the angle of the originally recorded fringes:

$$\Lambda' = \frac{m\Lambda}{\sqrt{1 + (m^2 - 1)\sin^2 \phi}} \tag{2}$$

In the expanded film the fringe inclination angle, $\phi'$, is given by:

$$\phi' = \tan^{-1}(m \tan \phi). \tag{3}$$

Figure 3:
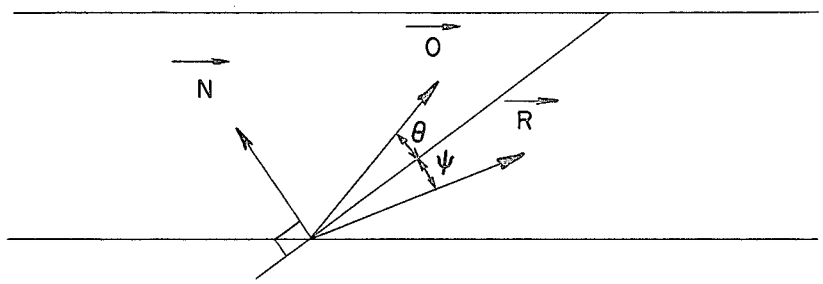
FIG. 3 is a perpendicular section through a holographic film showing exposing beam ray directions.

The visible light recording the interference fringe spacing and angle are calculated by:

$$\Lambda = \frac{\lambda_0}{2n_0 \sin\left(\frac{\cos^{-1}(\vec{O} \cdot \vec{R})}{2}\right)} \tag{4}$$

and $$\phi = \cos^{-1}(\vec{N} \cdot \vec{S}), \tag{5}$$

where $\lambda_0$ is the wavelength of the hologram recording visible light, $n_0$ is the index of refraction of the hologram recording material at the $\lambda_0$ wavelength and unit vectors $\vec{O}$ and $\vec{R}$. The unit vectors $\vec{O}$ and $\vec{R}$ are the visible light hologram exposing ray directions as shown in FIG. 3. All three of the unit vectors in FIG. 3 lie in the plane of the paper, a section cut perpendicular to the plane of the film. The angle between unit vectors $\vec{O}$ and $\vec{R}$ is bisected by the visible light recorded fringe, so that each of the unit vectors $\vec{O}$ and $\vec{R}$ form equal angles $\theta$ and $\phi$ with the visible light interference fringe. Mathematically, the relationship between the three unit vectors $\vec{N}$, $\vec{O}$, and $\vec{R}$ can be expressed as:

$$\vec{N} = \frac{\vec{O} - \vec{R}}{|\vec{O} - \vec{R}|} \tag{6}$$

The unit ray directions, $\vec{O}$ and $\vec{R}$, are inside the hologram recording material, and to find their directions outside the holographic film, simple refractive laws involving the index of refraction of air and the material can be applied. By applying equations (1) through (6) it is possible to calculate the visible light ray directions necessary to expose a silver halide photographic film and expand it by the factor in thickness to achieve an IRHOE having interference fringe spacings and orientation that differ from the original recording.

A specific example of fabricating an infrared holographic optical element from a silver halide emulsion hologram recorded with visible light is given:

EXAMPLE II

Expose a Kodak Type 120-02 photographic plate to the interfering light rays of a helium-neon laser operating at a wavelength of 632.8 nm to a level of illumination to give a post-development optical density at the same wavelength of approximately 3.27. The photographic development process employs conventional chemicals and methods: Kodak Developer D-19 (5 minutes), Kodak Acid Stop (30 seconds), Kodak Rapid Fixer with hardener (10 minutes), water wash (15 minutes), ambient air dry.

The exposure geometry of the visible light hologram is a symmetrical, plane wave, reflection recording. In this recording the light rays enter the emulsion from opposite sides of the photographic plate, forming an angle of about 20° with the perpendicular to the plate surface. Referring to FIG. 2, this geometry provides interference fringes that lie parallel to the surface of the plate substrate surface and angle $\phi$ is equal to zero, while vectors $\vec{S}$ and $\vec{N}$ are identical.

Following the holographic exposure and conventional development, the plate is bleached with bromine vapor for 105 minutes to convert the developed silver particles in the emulsion to the transparent silver bromide salt. The plate is then allowed to stand in moving ambient air for 16 hours to permit the outward diffusion of unreacted elemental bromine.

The hologram will now reflect light with maximum efficiency at about 600nm. To expand the film to infrared reflecting wavelengths, apply to the surface of the film a solution of one part by volume of glycerol and three parts by volume of water. The film expansion and, hence, the infrared reflecting wavelength can be stopped by removing the glycerol-water solution. In one minute of solution application, the peak reflective wavelength has risen to 1.52 microns, in three minutes to 1.60 microns, and the film thickness finally stabilizes after 20 minute solution application to yield a peak reflective wavelength of about 1.75 microns. Diffraction efficiency of the infrared radiation at the 1.75 micron wavelength is about 28%.

The infrared reflecting hologram can now be sealed with a protective cover glass and a clear optical grade epoxy resin, following the removal of excess glycerol-water solution from the film surface.

What is claimed is:

1. A method of forming a reflective latent hologram suitable for reconstruction at infrared wavelengths comprising:
   (a) first exposing a photographic silver halide emulsion film to the coherent beams emanating from a visible light source to form a latent image in said film comprised of fringe lines having preselected spacings and orientations,
   (b) causing said exposed film to be developed and fixed in a manner suitable for conventional photographic processes,
   (c) treating said film with swelling agents which cause said film to expand until a preselected volume is obtained and said fringe line spacings have been increased to a preselected distance thereby enabling said film to reflect IR radiation, and
   (d) geometrically fixing said expanded film to prevent further expansion or loss in volume.

2. The method of claim 1 wherein said swelling agents are selected from the group consisting of water, glycerol and aqueous glycerol mixtures.

3. The method of claim 1 wherein said swelling agent is $H_2O$.

4. The method of claim 1 wherein said mixture is an aqueous glycerol-mixture.

5. A method of preparing reflective holograms for reconstruction as infrared holographic optical elements comprising:
   (a) forming a latent image in a silver halide emulsion film by exposing said film to the coherent wavefronts emanating from a visible light source calculated to produce fringe lines within said film of a prelected spacing and orientation;
   (b) developing, fixing and, if desired, bleaching said exposed film, by exposing said film to selected conventional developing and fixing agents;
   (c) treating said exposed and developed film with a swelling agent, which causes the thickness and volume of said film to be expanded to a preselected thickness and volume thereby increasing the spacing between the fringe lines recorded in said film to a point where IR radiation will be reflected, and
   (d) geometrically fixing said expanded film thickness polymerizing a monomer diffused into the film to prevent further expansion or loss in volume.

6. The method of claim 5 wherein said swelling agent is selected from the group consisting of a high relative humidity, an aqueous bath, an aqueous mixture of glycerol, and glycerol.

* * * * *